US011660800B2

(12) United States Patent
Gatti et al.

(10) Patent No.: US 11,660,800 B2
(45) Date of Patent: May 30, 2023

(54) CALIBRATION METHOD AND DEVICE FOR THE PRODUCTION OF SEGMENTED EXTRUDED PRODUCTS

(71) Applicant: GIMAC DI MACCAGNAN GIORGIO, Castronno (IT)

(72) Inventors: Lorenzo Gatti, Castronno (IT); Simone Maccagnan, Castronno (IT)

(73) Assignee: GIMAC DI MACCAGNAN GIORGIO, Castronno (IT)

( * ) Notice: Subject to any disclaimer, the term of this patent is extended or adjusted under 35 U.S.C. 154(b) by 313 days.

(21) Appl. No.: 17/044,308

(22) PCT Filed: Apr. 1, 2019

(86) PCT No.: PCT/IB2019/052665
§ 371 (c)(1),
(2) Date: Sep. 30, 2020

(87) PCT Pub. No.: WO2019/193482
PCT Pub. Date: Oct. 10, 2019

(65) Prior Publication Data
US 2021/0078234 A1     Mar. 18, 2021

(30) Foreign Application Priority Data

Apr. 4, 2018 (IT) .................. 102018000004187

(51) Int. Cl.
*B29C 48/92* (2019.01)
*B29C 48/09* (2019.01)
(Continued)

(52) U.S. Cl.
CPC .............. *B29C 48/92* (2019.02); *B29C 48/09* (2019.02); *B29C 48/21* (2019.02); *B29C 48/297* (2019.02);
(Continued)

(58) Field of Classification Search
CPC ......... B29C 48/09; B29C 48/19; B29C 48/21; B29C 48/297; B29C 48/49; B29C 48/92;
(Continued)

(56) References Cited

U.S. PATENT DOCUMENTS 5,695,789 A * 12/1997 Harris .................... B29C 48/21
425/141
7,648,658 B2 * 1/2010 Harris ................ B29C 48/2692
425/141
(Continued)

FOREIGN PATENT DOCUMENTS

DE     102004039497     12/2005
EP         2177342      4/2012
(Continued)

OTHER PUBLICATIONS

Machine English translation of JP 63-260417, Oct. 27, 1988. (Year: 1988).*

*Primary Examiner* — Xiao S Zhao
*Assistant Examiner* — Joseph S Leyson
(74) *Attorney, Agent, or Firm* — Pearne & Gordon LLP; J. Gregory Chrisman

(57) ABSTRACT

Calibration method for machines for the production of segmented extruded products comprising the steps of: activating an extrusion process according to a plurality of operating parameters suitable for producing a segmented extruded product having at least one segmentation portion (6); injecting a marker at the segmentation portion (6) during its extrusion; detecting a plurality of characterizing parameters of the marker and/or of the segmentation portion (6), by selecting at least one of spatial distribution of the segmentation portion (6) and axial and/or radial position of the segmentation portion (6); selecting at least one operating parameter according to at least one of the detected charac- (Continued)

terizing parameters, so as to modify spatial distributions and/or axial and/or radial positions of the segmentation portion (6).

7 Claims, 3 Drawing Sheets

(51) Int. Cl.
*B29C 48/49* (2019.01)
*B29C 48/21* (2019.01)
*B29C 48/285* (2019.01)

(52) U.S. Cl.
CPC ........ *B29C 48/49* (2019.02); *B29C 2948/926* (2019.02); *B29C 2948/92114* (2019.02); *B29C 2948/92561* (2019.02); *B29C 2948/92704* (2019.02)

(58) Field of Classification Search
CPC . B29C 2948/92114; B29C 2948/92561; B29C 2948/9259; B29C 2948/926; B29C 2948/92704

See application file for complete search history.

(56) References Cited

U.S. PATENT DOCUMENTS

| | | | |
|---|---|---|---|
| 10,611,098 | B2 | 4/2020 | Stolyarov et al. |
| 2003/0219559 | A1 | 11/2003 | Schryver |
| 2010/0142310 | A1 | 6/2010 | Uphus et al. |
| 2016/0339633 | A1 | 11/2016 | Stolyarov et al. |
| 2017/0102225 | A1 | 4/2017 | Palmer et al. |
| 2020/0230869 | A1 | 7/2020 | Stolyarov et al. |

FOREIGN PATENT DOCUMENTS

| | | | |
|---|---|---|---|
| JP | 63-260417 | * | 10/1988 |
| WO | 2015156877 | | 10/2015 |
| WO | 2017062206 | | 4/2017 |

* cited by examiner

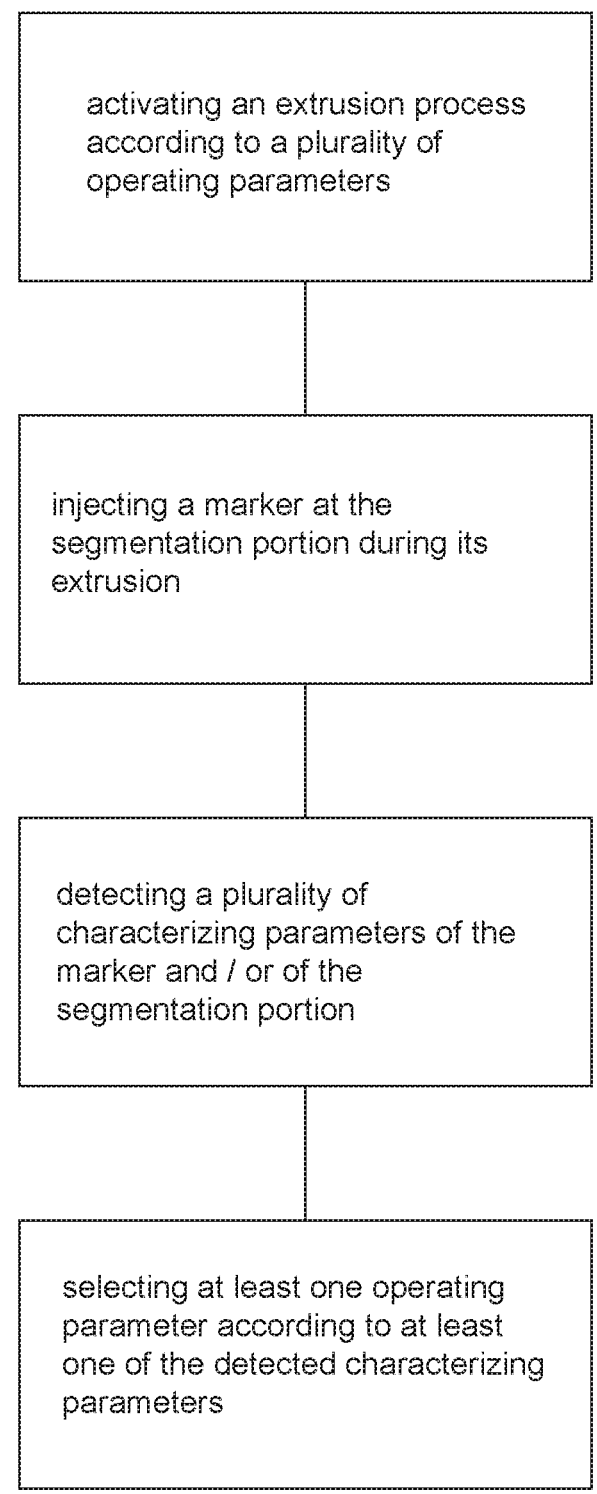

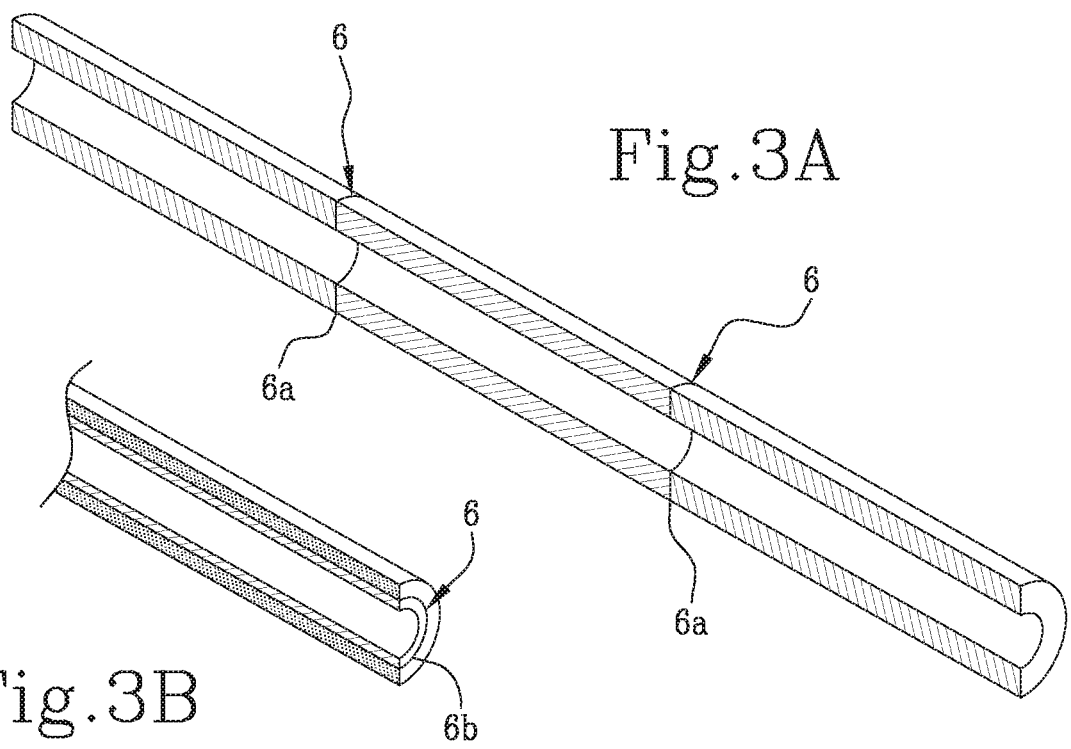
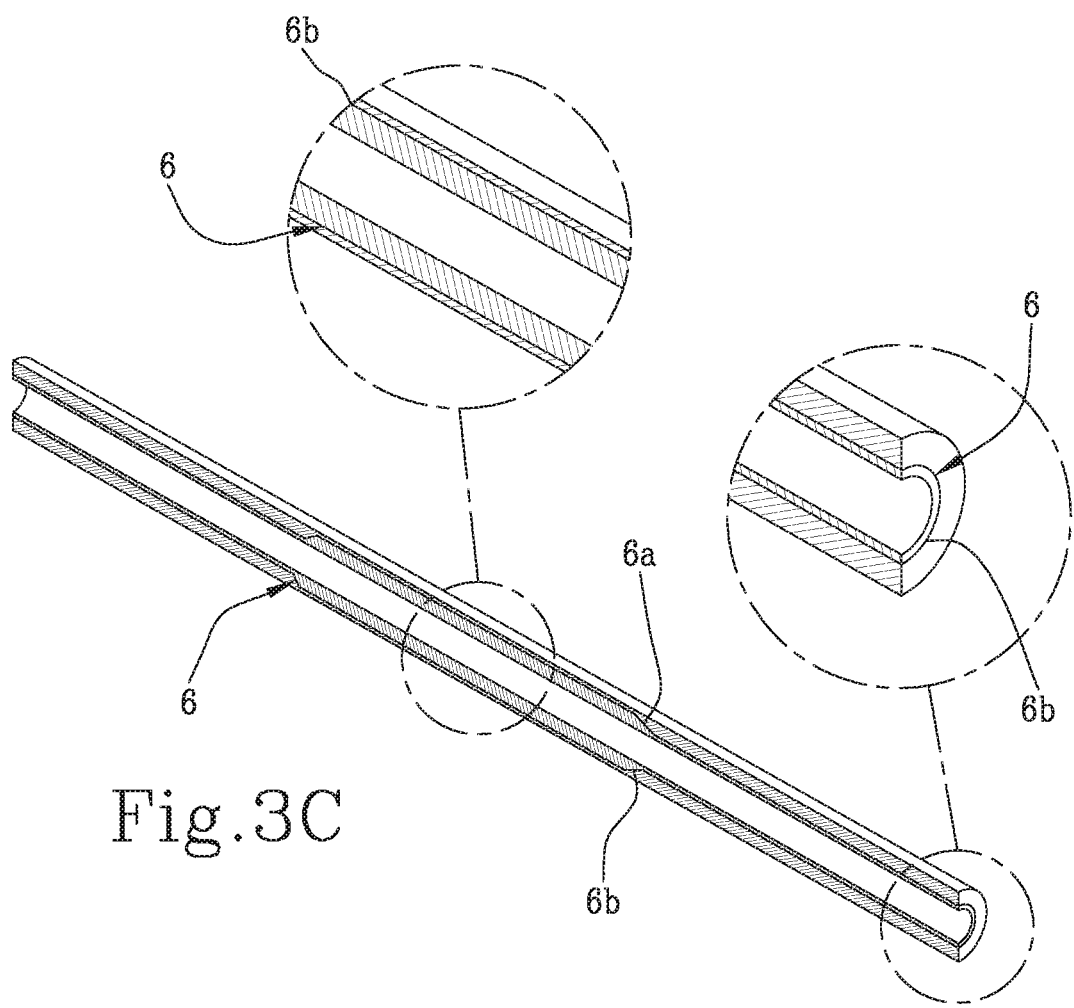

CALIBRATION METHOD AND DEVICE FOR THE PRODUCTION OF SEGMENTED EXTRUDED PRODUCTS

The present invention relates to the field of the processes for manufacturing extruded products, especially segmented extruded products.

In particular, the present invention relates to a calibration method and device for machines for the production of segmented extruded products.

The market for the production of extruded products is greatly expanding, especially as regards technical polymers, which, however, have the disadvantage of having characteristics widely differing from each other, in addition to the fact that, in case of use of materials with a non-optimal behaviour, or whose parameters of use are not precisely known, it is not easy to obtain a regular extrusion process and, more importantly, it is not always possible to predict, in planning, the actual behaviour of the material used during the extrusion step.

For this reason, it is essential to have systems which are able to operate in a flexible manner, adapting to the specifications of the material that is used, particularly during the extrusion step, so as to ensure the highest quality of the product to be produced.

This problem becomes particularly evident when the extrusion process is directed to the production of segmented extruded products, i.e. extruded products produced by using more than one material in the same product.

The production of a segmented extruded product allows to obtain products having different physical-chemical characteristics in different portions of the product, by simply modulating the type of material used to produce that particular portion.

However, for these products there is the additional problem of being capable of determining accurately the production dynamics and the actual structural characteristics of the segmentation portions 6, i.e. of all those portions of the product in which the change in the material used for the extrusion occurs.

In other words, in the segmentation portions 6 there is a gradual variation in the material used for the extrusion process, thus generating an interface between a first and a second material having different physical-chemical characteristics.

The characteristics and the actual position of the resulting segmentation portion 6 will depend on the characteristics of the materials used which generate the segmentation, and the operating parameters of the machine used.

Therefore, it is evident that an optimum calibration of the machine according to the particular characteristics of the materials used and the desired characteristics of the segmentation portion 6 is crucial for the production of high-quality products.

However, it is not always possible to obtain clear and accurate data concerning the structure and the position of the segmentation portions 6, since such a procedure would require studying the interface between materials which, albeit being different, may have very similar characteristics.

In addition, multiple materials may be employed within a single production process, or the same machine may be used in different moments to extrude a wide range of different materials, and this makes it extremely complex and expensive the choice and the implementation of an appropriate measurement system.

A specific measuring instrument suitable to obtain information in a first interface between two materials may indeed not succeed in obtaining information in a second interface where the materials involved are different.

Therefore, it would be needed to install a plurality of different measurement systems capable of performing a range of measurements as wide as possible, with the risk of increasing considerably the production costs for the installation of systems that might not even be ever actually used, or ending up with a system which is not able to perform the measurement desired, as it lacks the particular measurement system suitable for analysing the material in use at a given time.

All of this is in addition to logistical problems related to the management of the space surrounding the extrusion machine, which do not always allow the installation of several and cumbersome measurement systems.

In view of the above, the integration of a calibration step, which notably allows to obtain segmentation portions 6 having determined and repeatable characteristics, into the extrusion process until now has proven to be extremely complex, if not impossible.

In this context, the technical task underlying the present invention is to propose a calibration method for machines for the production of segmented extruded products that overcomes at least some of the drawbacks of the known art mentioned above.

In particular, it is an object of the present invention to provide a calibration method for machines for the production of segmented extruded products able to allow an efficient and optimal calibration of the machine independently from the characteristics of the materials to be extruded.

A further object of the present invention is to provide a calibration method for machines for the production of segmented extruded products that allows to obtain segmentation portions 6 having determined and repeatable characteristics.

The mentioned technical task and the specified aims are substantially achieved by a calibration method for machines for the production of segmented extruded products, including the technical specifications set out in one or more of the appended claims.

According to the present invention, a calibration method for machines for the production of segmented extruded products is illustrated, comprising the steps of:

activating an extrusion process according to a plurality of operating parameters suitable for producing a segmented extruded product having at least one segmentation portion 6;

injecting a marker at the segmentation portion 6 during its extrusion;

detecting a plurality of characterizing parameters of the marker and/or of the segmentation portion 6, by selecting at least one of spatial distribution of the segmentation portion 6 and axial and/or radial position of the segmentation portion 6;

selecting at least one operating parameter according to at least one of the detected characterizing parameters, so as to modify spatial distributions and/or axial and/or radial positions of the segmentation portion 6.

Preferably, the marker comprises at least one of: colouring agent, radio-opacifying agent, opacifying agent, magnetizing agent, fluorescent agent, luminescent agent, etc.

Preferably, the plurality of extrusion parameters comprises at least one of: extrusion speed, extrusion temperature, extrusion geometry, time duration and position of the transition from a first material to a second material.

The method of the present invention further comprises a step of storing, in a readable storage medium, the plurality of extrusion parameters, modified according to the characterizing parameters so as to allow a possible analysis and/or use thereof in a subsequent extrusion process.

Notably, the segmented extruded product has at least two axially and/or radially spaced segmentation portions 6, and, during the step of detecting a plurality of characterizing parameters of the marker, an axial and/or radial distance between each pair of segmentation portions 6 is measured.

Preferably, the segmented extruded product comprises at least two materials which are mechanically and/or optically and/or chemically similar, such materials being alternately extruded by defining a segmentation portion 6 arranged substantially axially 6a.

Preferably, the segmented extruded product comprises at least two materials which are mechanically and/or optically and/or chemically and/or electromagnetically similar, such materials being alternately extruded by defining a segmentation portion 6 arranged substantially radially 6b.

The present invention also relates to a calibration device for machines for the production of segmented extruded products which comprises a calibration head, which may be connected to an extrusion head of a machine for the production of segmented extruded products, having an injection conduit of a marker configured to inject it into a segmentation portion 6 of the segmented extruded product, and a control and actuation unit configured to activate the injection of the marker during the extrusion of the segmentation portion 6, as well as to detect at least one characterizing parameter of the marker therein.

Preferably, the calibration device comprises closed loop control means, operatively connectable to the extrusion head, configured to modify at least one operating parameter of an extrusion process according to at least one of the detected characterizing parameters of the marker.

Preferably, the calibration device comprises a readable storage medium operatively connected to the control and actuation unit.

Such readable storage medium is configured to store at least one operating parameter of an extrusion process modified according to the at least one characterizing parameter of the marker detected by the control and actuation unit.

Further characteristics and advantages of the present invention will become clearer from the indicative, and therefore non-limiting, description of a preferred, yet not exclusive, embodiment of a calibration method for machines for the production of segmented extruded products, as illustrated in the appended drawings, wherein:

FIG. 1 shows a block diagram of a possible embodiment of the calibration method for machines for the production of segmented extruded products;

FIG. 3a shows a product obtainable by the method of the present invention having axial segmentation portions;

FIG. 3b shows a product obtainable by the method of the present invention having radial segmentation portions;

FIG. 3c shows a product obtainable by the method of the present invention having both axial and radial segmentation portions concurrently.

Figure 2A:
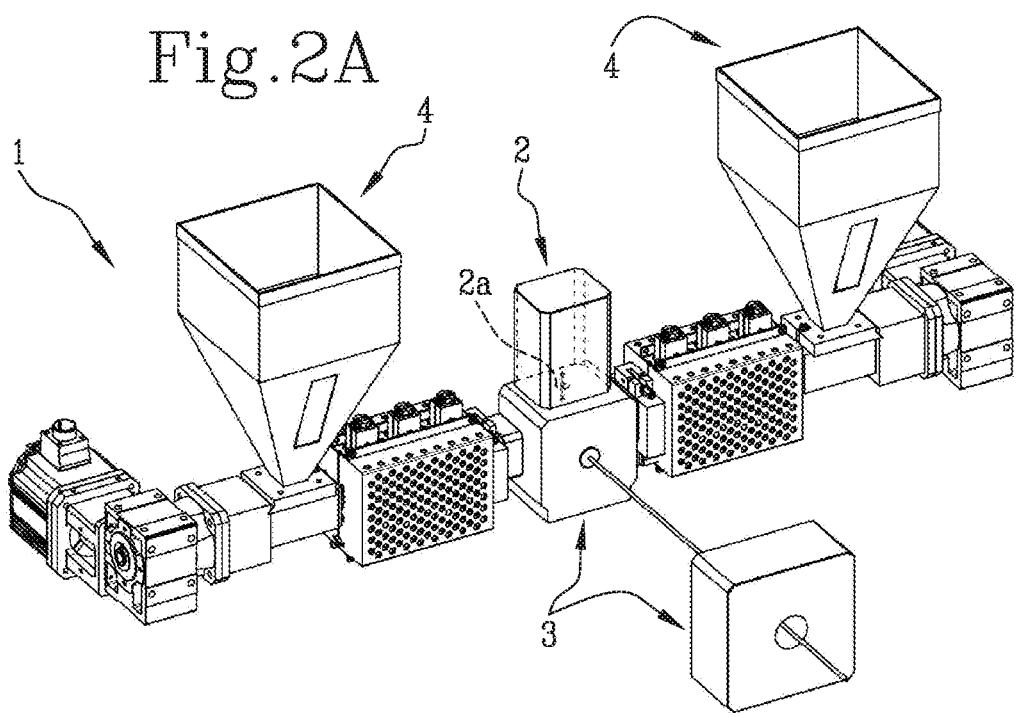
FIG. 2 shows a calibration device for machines for the production of segmented extruded products.
Figure 2B:
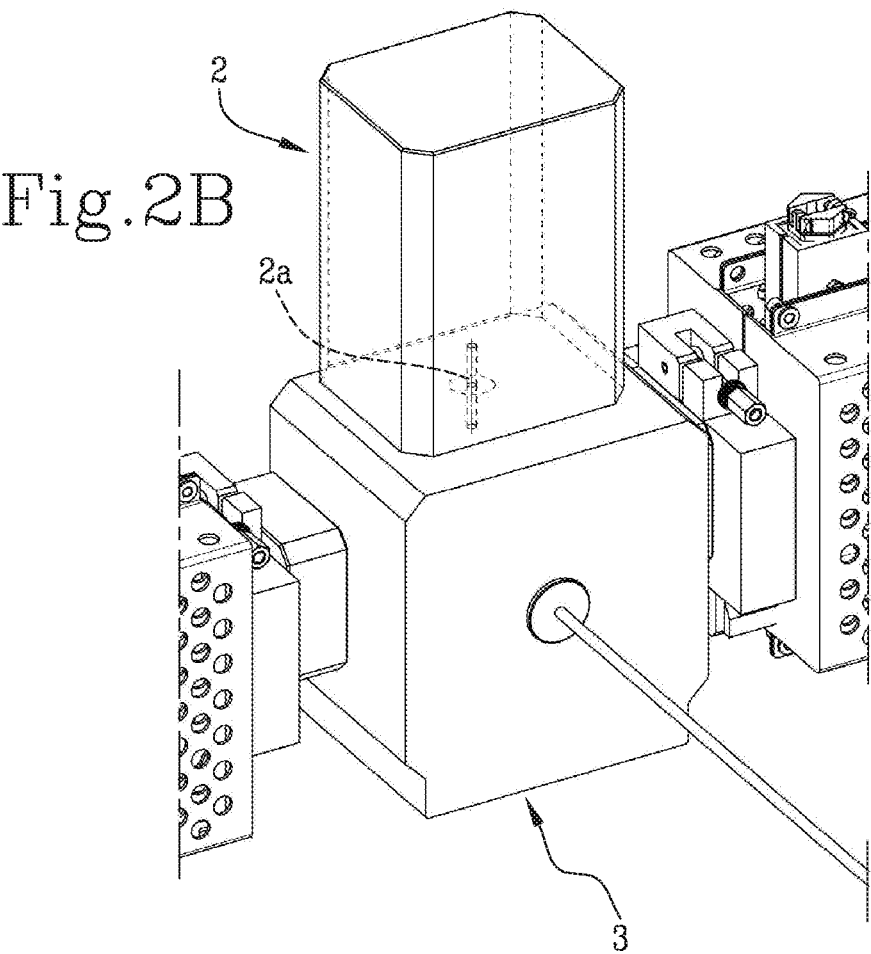

In the attached figures, 1 generally refers to a calibration device for machines for the production of segmented extruded products.

For the purposes of the present description, the term "segmented extruded products" refers to all those products which can be produced by extrusion processes and composed of at least two materials having different physical-chemical characteristics.

In particular, the device 1 of the present invention comprises a calibration head 2 and a control and actuation unit 3.

The calibration head 2 may be connected to an extrusion head 4 of a machine for the production of segmented extruded products, and has an injection conduit 2a of a marker, i.e. of a substance other than the materials being extruded, as well as detectable by appropriate detection systems.

Alternatively, the calibration head 2 may be integrally formed with the extrusion head 4, therefore the injection conduit 2a may be an internal duct of the extrusion head 4.

Notably, the marker may comprise at least one of: colouring agent, radio-opacifying agent, opacifying agent, magnetizing agent, fluorescent agent, luminescent agent, etc.

For example, the colouring agent can be any pigment or coloured polymer commonly used in the field of extruded product production processes.

The radio-opacifying agent may, for example, be made of barium sulphate.

The opacifying agent may, for example, be made of titanium oxide.

The magnetizing agent may, for example, be made of iron.

The fluorescent agent may, for example, be made of fluorescein.

The luminescent agent may, for example, be made of luciferin.

The injection conduit 2a is configured to inject the marker in a segmentation portion 6 of the segmented extruded product.

The term "segmentation portion" 6 is meant to define each portion of the segmented extruded product that has a transition between two different materials.

In other words, by means of the injection conduit 2a, it is possible to inject the marker into the segmented extruded product being manufactured by the extrusion head 4, specifically at each its segmentation portion 6 to be characterized, so that the marker is embedded within the segmentation portion 6, and that the subsequent study thereof allows to analyse the structural characteristics of the segmentation portion 6, and thus to calibrate properly the machine.

The control and actuation unit 3 is configured to activate the injection of the marker at the segmentation portion 6 and to detect by means of known detection devices at least one characterizing parameter of the marker inside the segmentation portion 6 into which it has been injected.

The control and actuation unit 3 carries out the detection of the characterizing parameters of the marker by means of known detection devices such as photometers, cameras, magnetometers, radiographic systems, spectrometers, mechanical sensors etc. Then, in use, the control and actuation unit 3 monitors the extrusion process and, upon detecting the beginning of the segmentation portion 6, i.e. detecting that the extrusion head 4 is extruding more than one material at the same time, activates the injection of the marker through the injection conduit 2a into the segmentation portion 6.

The control and actuation unit 3, for example, may monitor directly and constantly the material during extrusion and begin the injection of the marker upon detecting a change in at least one of physical-chemical characteristics of the material being monitored (this indicating that a change in the type of material being extruded is occurring), or receive directly from machine the information concerning a variation in the feed channel of the extrusion head 4.

Subsequently, the control and actuation unit 3 provides for detecting at least one characterizing parameter of the marker inside the segmentation portion 6.

Advantageously, such detection performed on the marker allows to obtain information concerning the segmentation portion 6 within which the marker is thus embedded.

Examples of information obtainable by analysing the marker are: size of the segmentation portion 6, spatial distribution of the segmentation portion 6, delay in mechanical response of the segmentation-generating system.

According to the detected characterizing parameters of the marker, some of the extrusion parameters may be changed in such a way as to modify the extrusion parameters by calibrating the machine for the production of segmented extruded products.

Examples of extrusion parameters liable to be modified are: extrusion speed, extrusion temperature, extrusion geometry, time duration of the transition from a first material to a second material, air or vacuum supply, in case it is a tube.

Such variation can be carried out manually by an operator according to an analysis of the information obtained by the control and actuation unit 3.

Alternatively, according to a further possible embodiment, the device 1 comprises closed loop control means, operatively connectable to the extrusion head 4 of a machine for the production of segmented extruded products.

The control means are configured to modify at least one extrusion parameter according to at least one of the detected characterizing parameters of the marker.

In other words, the closed loop control means receive the characterizing parameters of the marker obtained by the control and actuation unit 3 as input, and automatically modify at least one extrusion parameter by calibrating the machine depending on the desired result.

For example, if the control and actuation unit 3 measures a segmentation portion whose size is greater than desired, the control means can reduce the extrusion speed so that, at the same time duration of the transition from the first material to the second material, the size of the segmentation portion 6 is decreased.

This first step may lead to a size of the segmentation portion 6 that is not small enough, or by contrast excessively small, in this case it is sufficient to repeat the calibration process modifying the operating parameters of the machine until the desired result is achieved.

Advantageously, the device 1 may comprise a readable storage medium operatively connected to the control and actuation unit 3.

Such medium is configured to store the operating parameters of the extrusion process as modified according to at least one characterizing parameter of the marker detected by the control and actuation unit 3.

This way, it is possible to keep track of the operating parameters needed for a certain machine to obtain a given product.

The device of the present invention therefore allows to optimize production processes of segmented extruded products by providing the possibility to calibrate the machine producing them even when the materials employed are mechanically and/or optically and/or chemically and/or magnetically similar.

Similar materials refer to materials having a deviation lower than the level of accuracy of the measurement and/or detection system, typically around +/−5% when measuring a representative characteristic thereof, such as: coefficient of viscosity during extrusion, density, surface roughness, coefficient of reflection and/or transmission, elastic modulus, wavelength of the reflected light.

The present invention also relates to a calibration method for machines for the production of segmented extruded products.

The method is particularly adapted to be carried out by a calibration device 1 for machines for the production of segmented extruded products created in accordance with what has been described above.

Specifically, the method provides for activating an extrusion process according to a plurality of operating parameters so as to produce a segmented extruded product having at least one segmentation portion 6.

Subsequently, during the extrusion of a segmentation portion 6, i.e. while the extrusion head is moving from a first to a second material, the following step is injecting the marker at the segmentation portion 6.

This way, the marker is thus embedded within the segmentation portion 6, and may be used as a reference for studying its structural characteristics, especially in terms of position, shape, and size.

Regarding the detection of a plurality of characterizing parameters of the marker and/or of the segmentation portion 6, as indicated, such parameters can comprise for example information concerning: the size of the segmentation portion 6, the spatial distribution of the segmentation portion 6 inside the extruded product, the delay between the actuation and execution in the kinematic system, etc.

In addition, if the segmented extruded product has at least two segmentation portions 6, it is possible to measure also the distance between each pair of segmentation portions 6.

Upon completion of the detecting step, the following step is selecting at least one operating parameter according to at least one of the detected characterizing parameters, so as to modify spatial distributions and/or axial and/or radial positions of the segmentation portion 6.

In other words, the behaviour of the marker at the segmentation portion 6 may be analysed to obtain information about the latter (especially about its actual position inside the extruded product and the spatial distribution of the two materials it is comprised of therein) that allow to calibrate the machine for the production of segmented extruded products until a segmented portion having the desired characteristics is obtained.

It is also possible to perform a step of storing, in a readable storage medium, the plurality of operating parameters as modified according to the characterizing parameters.

This way, a possible analysis and/or use thereof in a subsequent extrusion process can be allowed.

It is noted that the extrusion process might also be affected by certain environmental parameters which cannot be controlled directly by the machine for the production of segmented extruded products, therefore it is not guaranteed that the stored operating parameters are always and anyway suitable for obtaining a specific product in different moments, hence performing the calibration method might be necessary even when a product already produced earlier is to be extruded, although the operating parameters related to a specific product and previously stored (thus already optimized) are certainly an ideal starting point which allows to narrow down the search for the transition to a specific area and reduce the time required to finalise the calibration procedure.

The method of the present invention proves to be particularly suitable for the calibration of machines for the production of segmented extruded products wherein the segmented extruded product comprises at least two materials which are extruded alternately, and the segmentation portion 6 is arranged substantially axially with respect to a main extrusion direction, i.e. the output direction of the extruded material from the extrusion head.

Alternatively, the method of the present invention is also applicable to segmented extruded products comprising at least two materials which are extruded at the same time and in which the segmentation portion 6 is arranged substantially radially with respect to the main extrusion direction. The method of the present invention can also be applied to segmented extruded products comprising simultaneously a plurality of segmentation portions 6, arranged partly radially and partly longitudinally with respect to the main extrusion direction.

Notably, the method and the device of the present invention may be used to obtain a product having 2 or more segmentation portions.

Each segmentation portion 6 has a spatial distribution.

In accordance with a particular embodiment, the method and the device 1 according to the present invention involve the use of a plurality of different markers within the same calibration process.

Notably, a different marker may be associated to each segmentation portion.

Such provision allows to select for each pair of materials defining the segmentation portion 6 the more efficient and compatible marker to work with these materials.

Furthermore, a simultaneous calibration of the production process of multiple segmentation portions 6 may also be performed, since the signal and the information obtained from a marker referring to a first segmentation portion 6 do not overlap and interfere with those derived from another marker referring to a second segmentation portion 6.

Alternatively, a sequence of calibration cycles may be performed, by calibrating a limited number of segmentation portions 6 for each calibration cycle.

Advantageously, the use of the device 1 and of the method described above to identify the properties of the segmentation portion 6 allow to achieve a significant optimization of the extrusion process and a resulting improvement of the characteristics of the manufactured product.

This solution, indeed, makes it possible to implement a simple and efficient calibration process that is extremely versatile since it is independent from the types of materials employed and from their distinctive intrinsic characteristics.

The invention claimed is:

1. Calibration method for machines for the production of segmented extruded products comprising the steps of:
    activating an extrusion process according to a plurality of operating parameters suitable for producing a segmented extruded product having at least one segmentation portion (6) between at least two materials;
    injecting a marker in correspondence of said at least one segmentation portion (6) during its extrusion;
    detecting a plurality of characterizing parameters of the marker and/or of the segmentation portion (6), said characterizing parameters comprising at least one of spatial distribution of the segmentation portion (6) and at least one axial and/or radial position of the segmentation portion (6);
    selecting at least one of the operating parameters according to at least one of the detected characterizing parameters, so as to modify spatial distributions and/or axial and/or radial positions of the at least one segmentation portion (6), wherein the segmented extruded product has at least two axially spaced segmentation portions (6) and during the step of detecting a plurality of characterizing parameters of the marker an axial distance between each pair of segmentation portions (6) is measured.

2. Method according to claim 1, wherein the marker comprises at least one of: colouring agent, radio-opacifying agent, opacifying agent, magnetizing agent, fluorescent agent, luminescent agent.

3. Method according to claim 1, wherein the plurality of extrusion parameters comprises at least one of: extrusion speed, extrusion temperature, time duration of the transition from a first material to a second material.

4. Method according to claim 1, comprising a step of storing, in a readable storage medium, the plurality of extrusion parameters, modified according to the characterizing parameters so as to allow an analysis and/or use in a subsequent extrusion process.

5. Method according to claim 1, wherein the segmented extruded product comprises at least two materials, said materials being alternately extruded by defining a segmentation portion (6), arranged substantially axially (6a).

6. Calibration method for machines for the production of segmented extruded products comprising the steps of:
    activating an extrusion process according to a plurality of operating parameters suitable for producing a segmented extruded product having at least one segmentation portion (6) between at least two materials;
    injecting a marker in correspondence of said at least one segmentation portion (6) during its extrusion;
    detecting a plurality of characterizing parameters of the marker and/or of the segmentation portion (6), said characterizing parameters comprising at least one of spatial distribution of the segmentation portion (6) and at least one axial and/or radial position of the segmentation portion (6);
    selecting at least one of the operating parameters according to at least one of the detected characterizing parameters, so as to modify spatial distributions and/or axial and/or radial positions of the at least one segmentation portion (6), wherein the segmented extrusion has at least two radially spaced segmentation portions (6) and during the step of detecting a plurality of characterizing parameters of the marker a radial distance between each pair of segmentation portions (6) is measured.

7. Method according to claim 6, wherein the segmented extruded product comprises at least two materials, said materials being simultaneously extruded by defining a segmentation portion (6), arranged substantially radially (6b).

* * * * *